United States Patent [19]

Takahashi

[11] Patent Number: 5,748,832
[45] Date of Patent: May 5, 1998

[54] VIDEO SIGNAL REPRODUCING SYSTEM

[75] Inventor: Koji Takahashi, Kanagawa-ken, Japan

[73] Assignee: Canon Kabushiki Kaisha, Tokyo, Japan

[21] Appl. No.: 731,120

[22] Filed: Oct. 9, 1996

Related U.S. Application Data

[63] Continuation of Ser. No. 479,574, Jun. 7, 1995, abandoned, which is a continuation of Ser. No. 161,197, Dec. 2, 1993, abandoned, which is a continuation of Ser. No. 706,227, May 28, 1991, abandoned.

[51] Int. Cl.⁶ ............................................. H04N 5/783
[52] U.S. Cl. ............................ 386/68; 386/46; 386/101
[58] Field of Search .................................. 386/46, 68, 81, 386/70, 82, 101, 52, 112, 122, 74; H04N 5/783

[56] References Cited

U.S. PATENT DOCUMENTS

| | | | |
|---|---|---|---|
| 4,361,849 | 11/1982 | Bolger | 358/312 |
| 4,496,995 | 1/1985 | Colles et al. | 360/33.1 |
| 4,500,930 | 2/1985 | Hamalainen et al. | 358/310 |
| 4,774,597 | 9/1988 | Harvey | 360/33.1 |
| 4,775,898 | 10/1988 | Akebane et al. | 358/335 |
| 4,887,169 | 12/1989 | Bannai et al. | 358/335 |
| 4,897,739 | 1/1990 | Hasegawa et al. | 358/335 |
| 4,905,104 | 2/1990 | Okamoto et al. | 360/64 |
| 4,910,605 | 3/1990 | Sasaki et al. | 360/312 |
| 5,027,232 | 6/1991 | Sekii et al. | 360/15 |
| 5,121,264 | 6/1992 | Ii | 360/10.3 |
| 5,122,885 | 6/1992 | Yoshioka et al. | 360/33.1 |
| 5,136,391 | 8/1992 | Minami | 358/312 |

FOREIGN PATENT DOCUMENTS

| 0036989 | 2/1987 | Japan | H04N 5/783 |
|---|---|---|---|

*Primary Examiner*—Thai Tran
*Assistant Examiner*—Huy Nguyen
*Attorney, Agent, or Firm*—Robin, Blecker & Daley

[57] ABSTRACT

A reproducing system for reproducing a video signal from a tape-shaped recording medium on which the video signal is recorded in each of many tracks having different azimuth angles between adjacent tracks includes a reproducing device arranged to use N rotary heads (N: an integer which is at least 2) which have different azimuth angles between adjacent heads and rotate in a closely adjacent state and to reproduce, with the heads, the video signals from N adjacent tracks on the tape-shaped recording medium as N channel video signals, and a monitoring device arranged to monitor the video signals by receiving only M channel video signals (M: an integer less than N) among the N channel video signals.

17 Claims, 8 Drawing Sheets

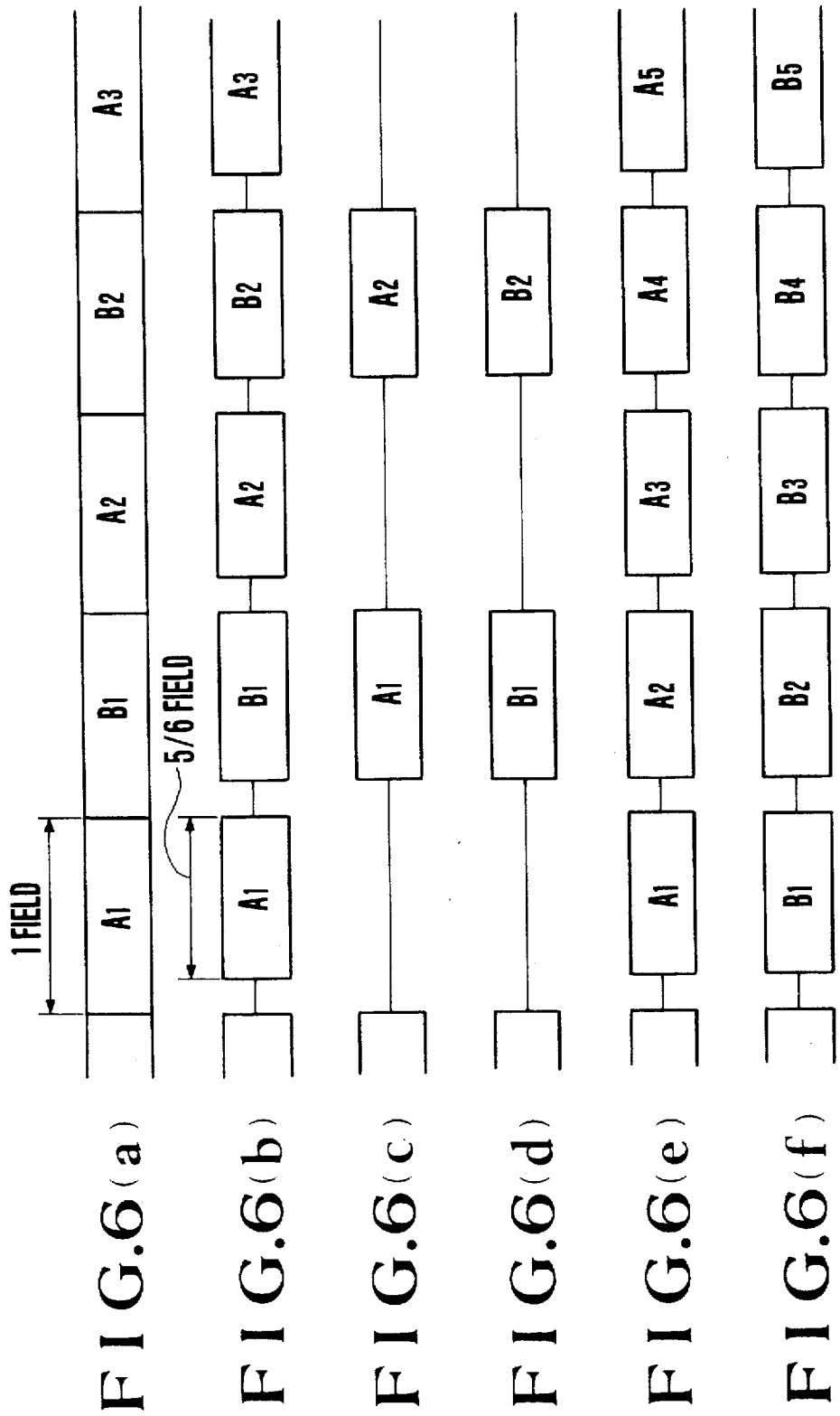

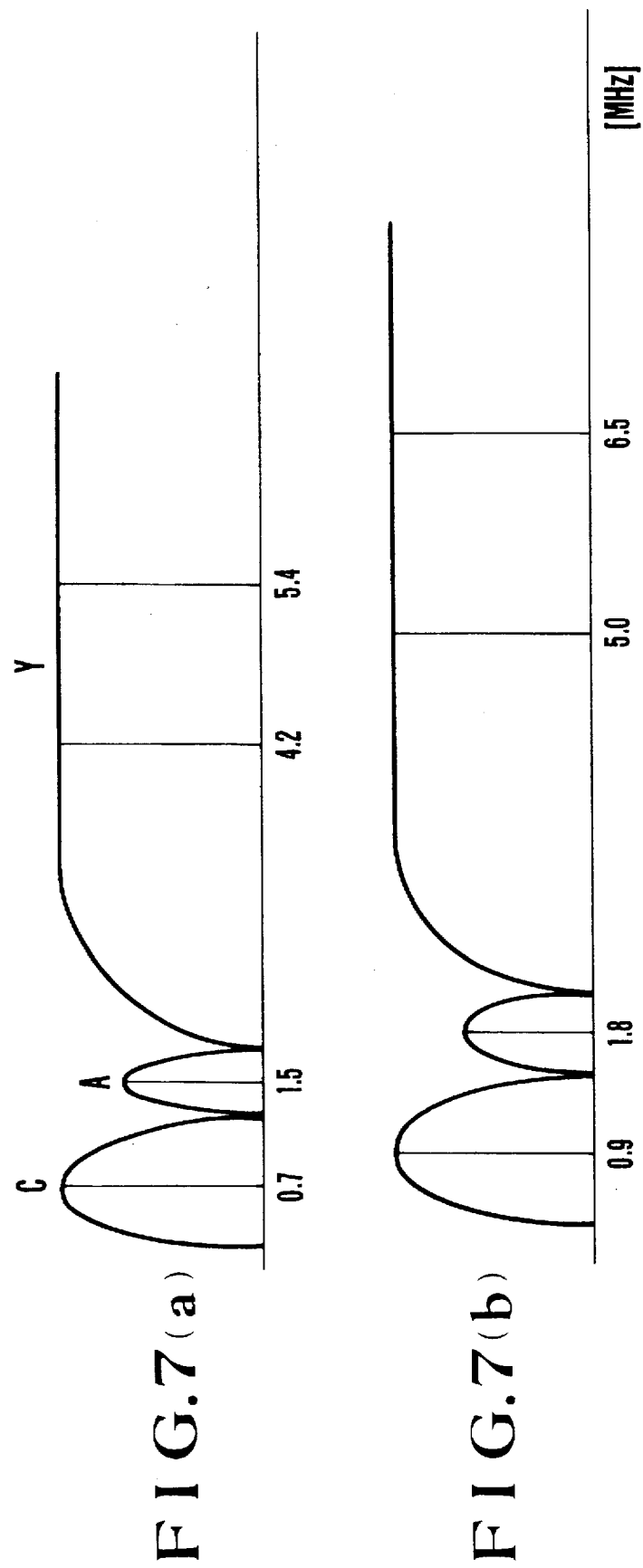

VIDEO SIGNAL REPRODUCING SYSTEM

This is a continuation application under 37 CFR 1.62 of prior application Ser. No. 08/479,574, filed Jun. 7, 1995, abandoned, which is a continuation of Ser. No. 08/161,197, filed Dec. 2, 1993, abandoned, which is a continuation of Ser. No. 07/706,227, filed May 28, 1991, abandoned.

BACKGROUND OF THE INVENTION

1. Field of the Invention

This invention relates to a reproducing system and more particularly to a system for reproducing information signals with a plurality of heads from a tape-shaped recording medium on which an amount of information signals for a given period of time are recorded in each of many recording tracks which have different azimuth angles between adjacent tracks.

2. Description of the Related Art

Apparatuses for reproducing an amount of information signals for a given period of time recorded in each of many recording tracks formed on a tape-shaped recording medium include helical-scanning type home video tape recorders (hereinafter referred to as VTRs). The following describes a reproducing system using the VTR of this kind:

The home VTRs which are known in general are of the kind called a two-head helical scanning type. FIGS. 1(a) and 1(b) show the head arrangement generally employed for the VTR of this kind. In FIGS. 1(a) and 1(b), a reference numeral 1 denotes a magnetic tape. Tape guides 2a and 2b are provided for wrapping the tape 1 at least 180 degrees around the periphery of a rotary drum 3. Rotary heads HA and HB are mounted on the rotary drum 3 at the same height in the direction of the axis of rotation and, as shown, are arranged to have a phase difference of 180 degrees between them. The azimuth angle of one head differs from that of the other. As is well known, these heads HA and HB are arranged to record and reproduce an amount of a video signal for one field while they rotate 180 degrees.

For the VTR of this kind, the length of track in which one field amount of video signal is to be recorded is specified as a standard. Accordingly, the diameter of the rotary drum 3 is determined by the specified length of track. This has prevented a reduction in size and weight of the VTR as the diameter of the drum 3 cannot be lessened.

To solve this problem, VTRs which are arranged to permit a reduction in diameter of the drum have been proposed. The VTR of that kind is arranged as follows: FIGS. 2(a) and 2(b) show the head arrangement of the prior art VTR of the kind using a small-diameter drum. Referring to these figures, rotary heads Ha and Hb have different azimuth angles. They make one turn in the one-field period of a video signal. The heads Ha and Hb are arranged close to each other to rotate with the phase difference of a very small angle $\partial°$ and are mounted on a rotary drum 4 at the same height in the direction of the axis of rotation.

A tape 1 is wrapped at least 300 degrees around the drum 4. One field amount of video signal is recorded while the rotary heads Ha and Hb rotate 300 degrees respectively. In other words, this VTR is capable of recording one field amount of video signal within a period shorter than the one-field period of the video signal.

Therefore, assuming that the video signal to be recorded by the VTR of that kind is of the NTSC system, the video signal must have a vertical scanning frequency fv at 60 Hz and a horizontal scanning frequency fh at 18.9 (15.75×6/5) KHz instead of those frequencies fv and fh of the normal NTSC signal which are 60 Hz and 15.75 KHz. In other words, the video signal to be recorded by the VTR of that kind must be either time-base-compressed to 5/6 of the normal TV signal or obtained from a video camera which is designed specially for that VTR.

The above-stated special video camera scans a picture plane of an aspect ratio 9:10 as indicated by a broken line Y in FIG. 3 and produces a picture of an aspect ratio 3:4 as an effective picture plane as indicated by a full line X within a 5/6 field period. The heads Ha and Hb shown in FIGS. 2(a) and 2(b) are capable of forming one track within the 5/6 field period. Therefore, one field amount of the video signal can be recorded in each track, so that the video signal is recordable by the same format as the VTR having the head arrangement as shown in FIGS. 1(a) and 1(b). In other words, with the VTR of the head arrangement as shown in FIGS. 2(a) and 2(b) arranged to record the above-stated video signal, the drum diameter can be reduced to 3/5 of that of the VTR of the head arrangement shown in FIGS. 1(a) and 1(b).

Further, an arrangement to time-base-expand a reproduced video signal to 6/5 of it per field enables the VTR of the head arrangement of FIGS. 2(a) and 2(b) to perform a reproducing operation in the same manner as the VTR of the head arrangement shown in FIGS. 1(a) and 1(b).

Meanwhile, in performing tape dubbing with two VTR units, dubbing is generally carried out in real time. For example, in dubbing a two-hour amount of motion picture information, a standard TV signal is generally transferred by taking a period of two hours.

However, as a result of popularization of the camera-integrated VTRs, many people now wish to do editing and dubbing work in an easy and simple manner. The real-time dubbing is too troublesome for users who are accustomed to high-speed dubbing with audio tape recorders. For example, deletion of a very small part of a two-hour long motion picture necessitates much time and labor.

Further, in dubbing with the VTR having a small drum as shown in FIGS. 2(a) and 2(b), the video signal which has been time-base-compressed to 5/6 per field is temporarily time-base-expanded to make it into the form of the standard TV signal. After that, the signal must be again time-base-compressed for every field. It thus has necessitated various processes for high-speed dubbing.

Besides, a greater amount of video information is reproduced per unit time by high-speed dubbing than normal reproduction. Therefore, the high-speed dubbing necessitates highly troublesome processes for monitoring reproduced signals.

SUMMARY OF THE INVENTION

Such being the background situation, it is a general object of this invention to provide a reproducing system which permits a simple monitoring action on a reproduced video signal having a great amount of information reproduced per unit time.

Under this object, a video signal reproducing system which is arranged according to this invention as an embodiment thereof comprises N rotary heads (N: an integer which is at least 2) arranged to trace a tape-shaped recording medium on which a video signal is recorded in each of many tracks having different azimuth angles between adjacent tracks and to reproduce the video signals as N channel video signals in parallel from N adjacent tracks among the many tracks; and monitoring means arranged to receive only M channel video signals (M: an integer which is less than N) among the N channel video signals and to monitor the video signals.

The above and other objects and features of this invention will become apparent from the following detailed description of embodiments thereof taken in connection with the accompanying drawings.

BRIEF DESCRIPTION OF THE DRAWINGS

FIGS. 6(a) to 6(f) show in a timing chart the signal processing timing of each of various parts of the system of FIG. 4. FIGS. 7(a) and 7(b) show video signals to be handled by the system of FIG. 4.

DETAILED DESCRIPTION OF THE EMBODIMENTS

Figure 4:
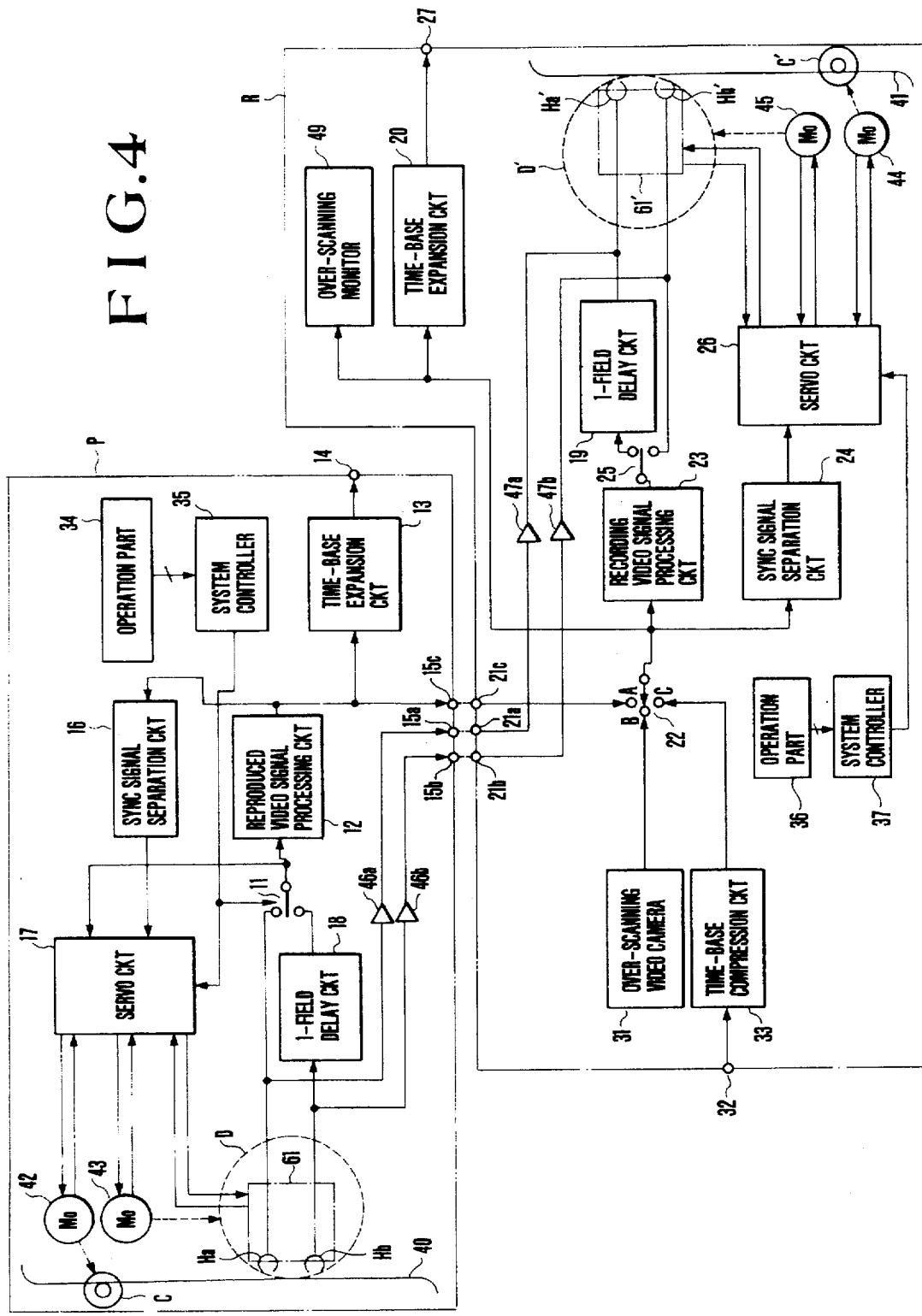
FIG. 4 is a block diagram showing in outline the arrangement of a dubbing system arranged as a reproducing system embodying this invention.
Figure 5A:
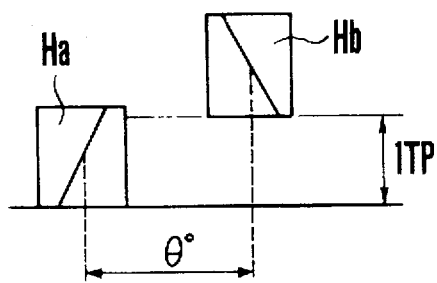
FIGS. 5(a) and 5(b) show the head arrangement of the VTR of the system shown in FIG. 4.
Figure 5B:
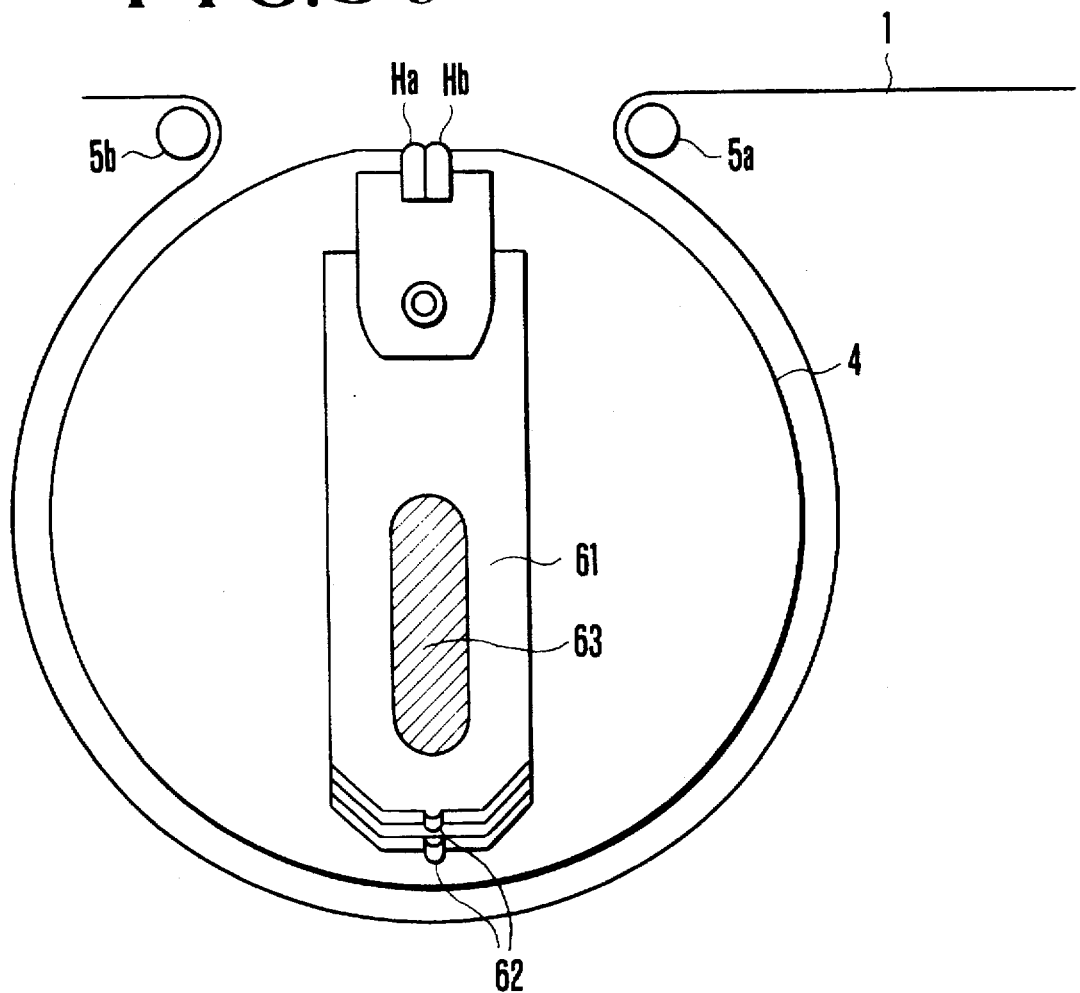

The following describes in detail reproducing systems arranged as embodiments of this invention:

FIGS. 4 shows in outline the arrangement of a dubbing system arranged as a reproducing system embodying this invention. FIGS. 5(a) and 5(b) show the head arrangement of each of reproducing-side and recording-side VTRs of the system of FIG. 4.

Figure 2A:
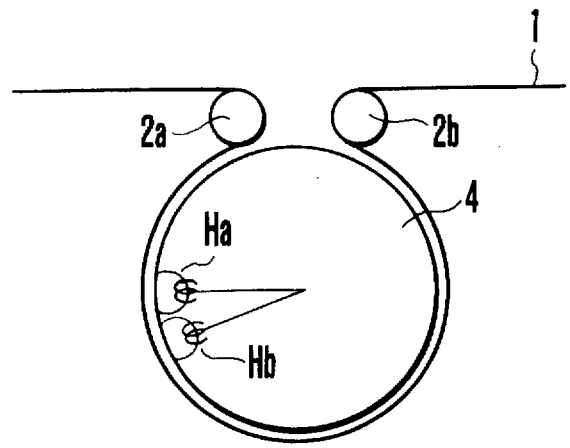
FIGS. 2(a) and 2(b) show the head arrangement of the conventional VTR of the kind using a compact drum.
Figure 2B:
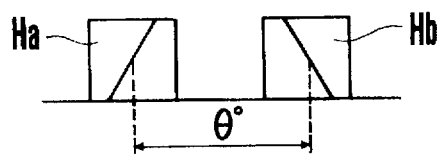
Figure 3:
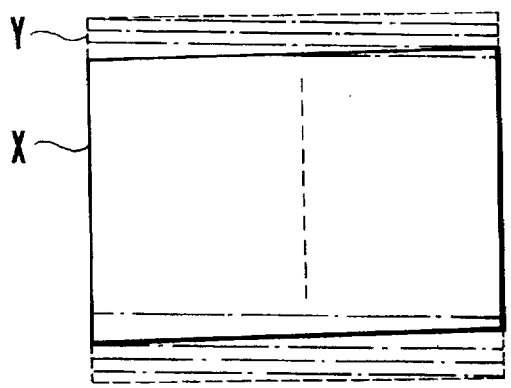
FIG. 3 is an illustration for explaining a video camera designed to be used solely for the VTR having the head arrangement shown in FIGS. 2(a) and 2(b).

The head arrangement of the VTR on the reproduction side of the system of this embodiment and that of the recording side of the system differ from the head arrangement shown in FIGS. 2(a) and 2(b) in the following points: The positions of heads Ha and Hb are shifted relative to each other as much as one track pitch (1 TP) in the direction of the axis of rotation. In addition to this, these heads Ha and Hb are disposed on an electrostrictive element 61 which is arranged as an actuator to displace these heads in the direction of the axis of rotation.

Referring to FIG. 4, a reference symbol P denotes the VTR disposed on the side of reproduction (hereinafter referred to as a reproducing-side VTR). A symbol R denotes the VTR disposed on the side of recording (hereinafter referred to as a recording-side VTR). For the sake of simplification of illustration, FIG. 4 shows only such parts that participate in reproduction and recording. Either of these VTRs may be arranged to perform a recording or a reproducing function. Magnetic tapes 40 and 41 have the same recording format as that of the VTR having the head arrangement shown in FIGS. 1(a) and 1(b).

The normal reproducing operation of the reproducing-side VTR P of FIG. 4 is first described as follows: When an instruction for normal reproduction is given from an operation part 34, a system controller 35 causes a servo circuit 17 to control a capstan motor 42. The tape 40 is then moved by a capstan C at a rate of one track per one field period.

Meanwhile, the servo circuit 17 is caused by the system controller 35 to control a drum motor 43 to rotate a drum D one turn per one field period. As a result, the heads Ha and Hb come to serially trace tracks one after another respectively. In the period of one field during which the head Ha is tracing a track Ta which has an azimuth angle corresponding to the head Ha, the other head Hb traces a track Tb which has an azimuth angle corresponding to the head Hb. During this period, a reproduced signal can be taken out by the heads Ha and Hb. In a next one-field period ensuing on the above-stated period, the head Ha traces the track Tb while the head Hb traces the track Ta. During this ensuing period, no reproduced signal is obtained.

FIGS. 6(a) to 6(f) show in a timing chart the action of each part of the dubbing system of this embodiment. In these figures, reference symbols A1, B1, A2, - - - denote one-field amounts of a video signal. In the case of the VTR of the dubbing system of this embodiment, the video signal of the kind arranged as shown in FIG. 6(a) is reproduced as shown in FIGS. 6(c) and 6(d). Whereas, a VTR having heads arranged as shown in FIGS. 2(a) and 2(b) gives a reproduced video signal as shown in FIG. 6(b).

The signal reproduced by the head Hb is delayed one field period by a 1-field delay circuit 18 to be supplied to a switch 11 together with the signal reproduced by the head Ha. The connecting position of the switch 11 is controlled by the system controller 35 to be on the side of the head Ha for the one-field period during which the signal is reproducible by the heads Ha and Hb and to be on the side of the delay circuit 18 for the next one-field period. As a result, the output of the switch 11 becomes a signal which is time-base-compressed simply to 5/6 of the signal of each field, as shown in FIG. 6(b).

Figure 1A:
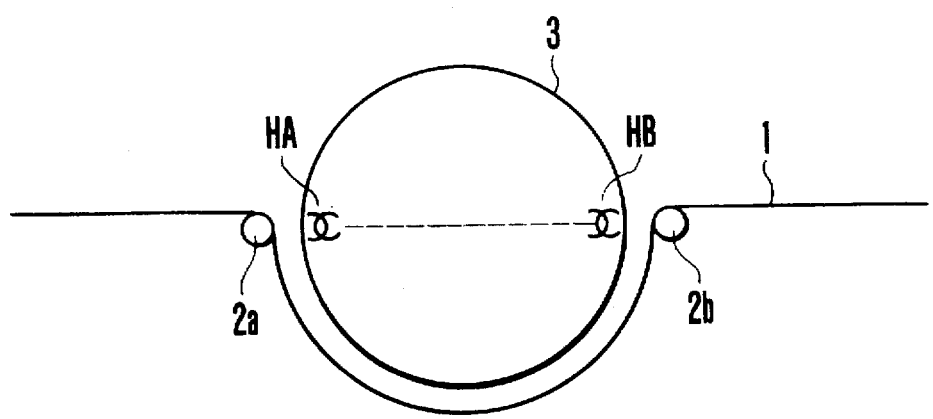
FIGS. 1(a) and 1(b) show the head arrangement generally employed for the conventional VTR.
Figure 1B:
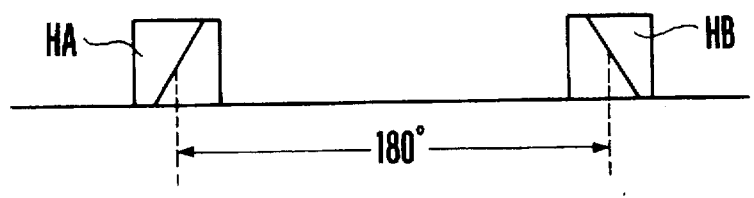

FIG. 7(a) and 7(b) show the signals reproduced by the VTR of the system of this embodiment. FIG. 7(a) shows the spectrum allocation of signals which are recorded and reproduced by the head arrangement of the prior art VTRs shown in FIGS. 1(a) and 1(b), and FIG. 7(b) shows that of the signals recorded and reproduced by the VTRs of the system of this embodiment. In these figures, a reference symbol Y denotes a frequency modulated luminance signal. A symbol A denotes a frequency-modulated audio signal. A symbol C denotes a low-band-converted chrominance signal.

As apparent from FIGS. 7(a) and 7(b), the frequency of the signal output from the switch 11 of this embodiment is 1.2 times as high as the signal reproduced by the head arrangement of the prior art VTR shown in FIGS. 1(a) and 1(b). The operating frequency of a reproduced video signal processing circuit 12 of this embodiment is 1.2 times as high as that of the VTR having the head arrangement as shown in FIGS. 1(a) and 1(b).

The reproduced video signal processing circuit 12 outputs a reproduced video signal obtained by mixing a reproduced luminance signal and a reproduced chrominance signal. The reproduced luminance signal is obtained by frequency-demodulating a frequency-modulated luminance signal included in the signal output from the switch 11. The reproduced chrominance signal is obtained by frequency-converting back to its original band a chrominance signal which is also included in the signal output from the switch 11 in a state of having been converted to a low band. A synchronizing (hereinafter referred to as sync) signal separation circuit 16 separates a sync signal included in the reproduced video signal and supplies the separated sync signal to the servo circuit 17. The sync signal thus obtained is used as a reference signal for the above-stated control over the drum motor 43 and the capstan motor 42.

Further, to ensure that the tracks are accurately traced by the heads Ha and Hb, the servo circuit 17 is arranged to control the capstan motor 42 in such a way as to maximize the amplitude of the output of the switch 11. Since this tracking control operation is well known and is not related directly to the present invention, the details of it are omitted from description.

This reproduced video signal can be also output from a terminal 15c. However, the reproduced video signal is a signal obtained by time-base-compressing the signal of each field to 5/6 of it as mentioned above. In cases where the reproducing operation is to be monitored by an external monitor or the like, therefore, the signal of each field is time-base-expanded to 6/5 by means of a time-base-expansion circuit 13 before it is output from a terminal 14.

The audio signal is not related directly to this invention. Therefore, the details of the audio signal are omitted from description in the present specification.

Next, the normal recording operation of the recording-side VTR R shown in FIG. 4 is described as follows: In the case of the system of this embodiment, the recording-side VTR is assumed to be a camera-integrated type VTR and is provided with the special video camera (over-scanning video camera) 31. The head arrangement of the recording-side VTR is the same as that of the reproducing-side VTR. However, for the sake of distinction from the heads Ha and Hb of the reproducing-side VTR, the heads of the recording-side VTR are indicated as Ha' and Hb'. The above-stated camera 31 is arranged to produce a video signal as shown in FIG. 6(b). The video signal is supplied to one terminal B of a switch 22. An external input terminal 32 is arranged to receive a video signal which is continuous as shown in FIG. 6(a). A time-base compression circuit 33 time-base-compresses this video signal to 5/6 for every field to make it into a signal which is shown in FIG. 6(b). The signal thus obtained by the circuit 33 is supplied to one terminal C of the switch 22. Further, a terminal 21c receives such a video signal as the signal shown in FIG. 6(b). The video signal received at the terminal 21c is supplied as it is to a terminal A of the switch 22.

With a normal recording mode selected at an operation part 36, when an instruction is given as to which of the input signals is to be recorded, the switch 22 supplies the input signal selected to a recording video signal processing circuit 23 and a sync signal separation circuit 24.

A servo circuit 26 controls a capstan motor 44 by using information supplied from a system controller 37 according to the operation of the operation part 36 and a sync signal separated by the sync signal separation circuit 24. This causes a capstan C' to move a tape 41 at a rate of one track per field period. The servo circuit 26 controls also a drum motor 45 in such a way as to cause a drum D' to make one turn per field period.

The recording video signal processing circuit 23 frequency-modulates a luminance signal and converts the subcarrier frequency of a chrominance signal to a lower band to obtain a signal which is shown in FIG. 7(b). The signal thus obtained is supplied to a switch 25. The connecting position of the switch 25 alternately changes for every field period from on the side of a delay circuit 19 over to the side of a head Hb' and vice versa. As a result, signals supplied to the heads Ha' and Hb' become as shown in FIGS. 6(c) and 6(d). The heads Ha' and Hb' are positioned to deviate from each other as much as one track pitch in the direction of the axis of rotation. The head Ha' is thus arranged to trace the tape 41 a little ahead of the head Hb'. This allows the heads Ha' and Hb' to simultaneously form two tracks once per two field periods. As a result, recording is performed in the same manner as the head arrangements of the prior art VTRs shown in FIGS. 1(a), 1(b), 2(a) and 2(b).

The signal output from the switch 22 is supplied to a special (over-scanning) monitor 49, which is arranged to scan from the upper end to the lower end of a monitor picture plane within 5/6 field period in the cycle of one field period and has its horizontal scanning frequency set at 5/6 of a normal horizontal scanning frequency. The recording state is thus monitored by the monitor 49. In the case of a camera-integrated VTR, this monitor 49 is used as a so-called electronic viewfinder. Further, to permit monitoring with an external monitor, there is provided a time-base expansion circuit 20 which is arranged to time-base-expand the signal of each field to 6/5. The output of the time-base expansion circuit 20 is supplied to an output terminal 27 as a normal video signal which is shown in FIG. 6(a).

A dubbing operation with the above-stated reproducing-side and recording-side VTRs is described as follows:

The output terminals 15a and 15b of the reproducing-side VTR are connected to the input terminals 21a and 21b of the recording-side VTR. After that, when a dubbing mode is designated by the operation part 34 of the reproducing-side VTR and the operation part 36 of the recording-side VTR, the servo circuits 17 and 26 control the capstan motors 42 and 44 to cause the tapes 40 and 41 to be moved by the capstans C and C' at a rate of two tracks per one field period. The servo circuits 17 and 26 control also the drum motors 44 and 45 to cause the drums D and D' to make one turn per one field period.

This causes each of the reproducing heads Ha and Hb to trace every other track formed on the tape 40. With the servo circuit 17 arranged as mentioned above to carry out tracking control in such a way as to obtain the maximum output of the switch 11, the reproducing heads Ha and Hb trace only the tracks Ta and Tb respectively.

Figure 8:
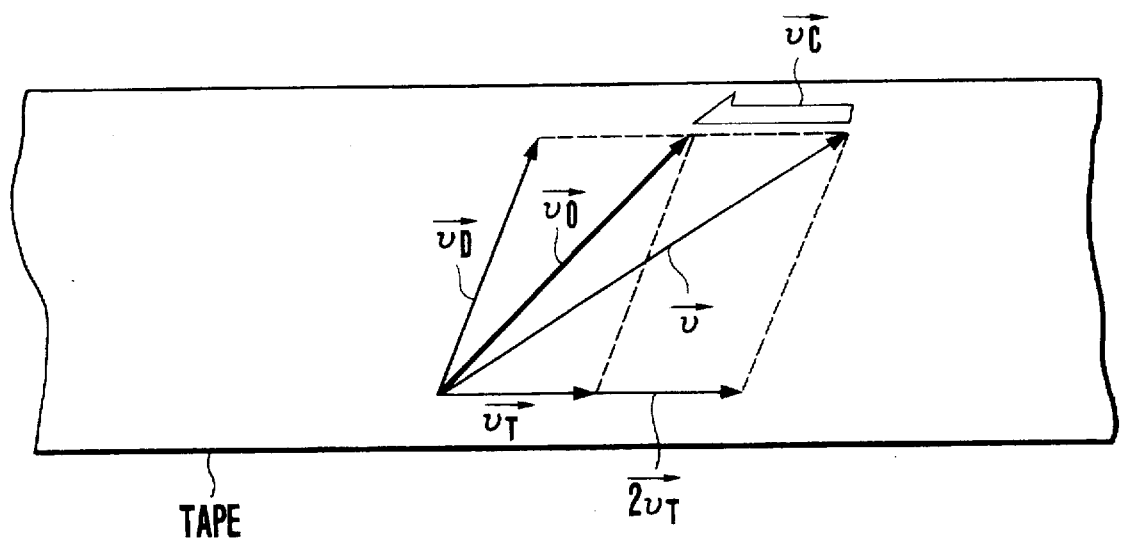
FIG. 8 shows the loci of head traces obtained by the VTR of the system of FIG. 4 during normal recording or reproduction and during dubbing.

However, since the tape transport speed in this case differs from the speed for normal reproduction, the heads Ha and Hb may not trace the tape in parallel to the tracks as shown in FIG. 8. Referring to FIG. 8, a reference symbol $\vec{v}T$ denotes a vector corresponding to the travel of the tape 40 during normal reproduction. A symbol $\vec{v}D$ denotes a vector corresponding to the rotation of the reproducing heads Ha and Hb. A symbol $\vec{v}O$ denotes a composite vector obtained from the above-stated vectors. In the case of dubbing, the vector corresponding to the travel of the tape 40 becomes $2\vec{v}T$ and the composite vector $\vec{v}$. In order to make this vector $\vec{v}$ coincide with the vector $\vec{v}O$, this embodiment is arranged to obtain the movement corresponding to a vector $\vec{v}C$ by means of the electrostrictive element 61 which is composed of a bimorph cell. In other words, in the 5/6 field period during which the heads Ha and Hb are tracing the surface of the tape 40, the electrostrictive element 61 progressively shifts the heads Ha and Hb to the extent of one track in the direction of the axis of rotation. The shift is reset during the remaining 1/6 field period. This action is repeated for every field and is caused by the servo circuit 17. This enables the heads Ha and Hb to trace the tape in parallel to the tracks, so that the tracks Ta and Tb can be accurately traced under the tracking control.

In FIG. 5(b), a reference numeral 61 denotes the bimorph cell. A numeral 62 denotes terminals to which a control signal is given from the servo circuit 17. A numeral 63 denotes a sensor such as a strain gage or the like. This sensor 63 is capable of detecting the absolute positions of the heads Ha and Hb in the direction of the axis of rotation and is provided for the purpose of accurately determining the positions of the heads for normal recording and reproduction. The output of the sensor 63 is arranged to be fed back to the servo circuit 17.

FIGS. 6(e) and 6(f) show the reproduced signals obtained by the heads Ha and Hb during dubbing. These signals are supplied to the output terminals 15a and 15b through reproduction amplifiers 46a and 46b respectively.

Meanwhile, the connecting position of the switch 11 remains on one side A thereof. The reproduced signal obtained by the head Ha as shown in FIG. 6(e) is supplied to the reproduced video signal processing circuit 12. The output of the circuit 12 is supplied to the time-base expansion circuit 13 to be converted into a signal form which permits reproduction monitoring by an external monitor or the like. As a result, a video signal reproduced at a double-increased speed, i.e., for every other field, is output from the terminal 14. The video signal thus output is supplied to the external monitor, so that a dubbing operation can be monitored. However, if the video signal is of the interlaced scanning type, the signal would be repeatedly output only for odd-number fields. It is, therefore, necessary to prevent a skew from occurring, by effecting a delay by 1/2 horizontal scanning period for every other field.

The recording-side VTR receives the signals which are shown in FIGS. 6(e) and 6(f) from the reproducing-side VTR through terminals 21a and 21b. These signals are supplied to the heads Ha' and Hb' via recording amplifiers 47a and 47b. Meanwhile, the heads Ha' and Hb' are displaced by an electrostrictive element 61', in the same manner as the heads Ha and Hb of the reproducing-side VTR, under the control of the servo circuit 26.

This enables the heads Ha' and Hb' to trace the surface of the tape 41 in the same direction as in normal recording. As a result, a 2-field amount of video signal is recorded simultaneously in adjacent tracks of different azimuth angles. This action is performed for every field period. The arrangement enables the dubbing operation to be carried out at a speed two times as fast as the speed of normal recording and reproduction.

The video signal reproduced at the double-increased speed is supplied via terminals 15c and 21c to the terminal A of the switch 22. During dubbing, the switch 22 is connected to the terminal A by the system controller 37. The recording video signal processing circuit 23 is disconnected from the heads Ha' and Hb'. The video signal supplied to the terminal A of the switch 22 is, therefore, supplied to an over-scanning monitor 49 and a time-base expansion circuit 20. The state of dubbing is monitored by the monitor 49 while the signal is output from a terminal 27 as a normal video signal.

The dubbing system of the embodiment described is capable of carrying out a high-speed dubbing operation at a speed two times as fast as the normal speed by using VTRs of a small drum diameter, without increasing the number of heads and by simply adding dubbing terminals and amplifiers. Besides, the provision of the bimorph cell, etc. permits the embodiment to be used also as a VTR for normal recording and reproduction, so that the system can be efficiently used. Further, the arrangement to use only the signal reproduced by the head Ha for monitoring at the time of dubbing facilitates the monitoring action during the high-speed dubbing.

Figure 9:
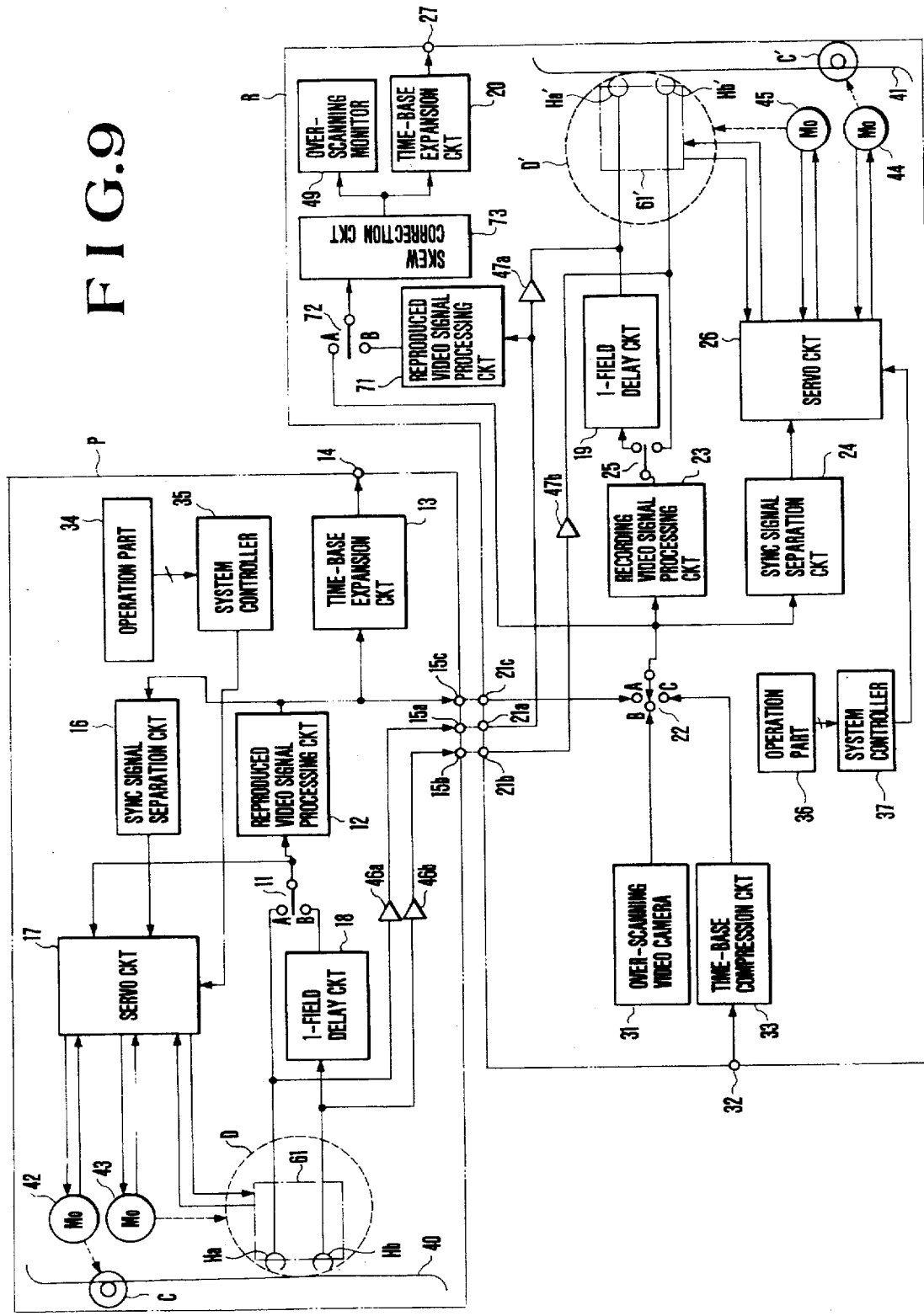
FIG. 9 is a block diagram showing in outline the arrangement of a dubbing system or a reproducing system arranged as another embodiment of this invention.

FIG. 9 shows in outline the arrangement of a dubbing system which is arranged as another embodiment of this invention. In FIG. 9, the same component parts as those of FIG. 4 are indicated by the same reference numerals and the details of them are omitted from description.

In the case of the system shown in FIG. 9, a monitoring action during dubbing is arranged to be performed on the side of a recording-side VTR R by using only one of the dubbing signals of two channels supplied to the input terminals 21a and 21b of the recording-side VTR. A video signal which is in the state of an RF signal comes from the input terminal 21a to a reproduced video signal processing circuit 71. The circuit 71 is arranged in the same manner as the circuit 12 to make the reproduced video signal into a signal form suited for monitoring. The signal thus obtained is supplied via the terminal B of a switch 72 to a skew correction circuit 73. During dubbing, the skew correction circuit 73 operates in response to an instruction from a system controller 37 to perform a skew preventing process by effecting a delay by 1/2 horizontal scanning period. A signal thus output from the skew correction circuit 73 is supplied to an over-scanning monitor 49 and a time-base expansion circuit 20. The state of dubbing is monitored by the monitor 49. Meanwhile, the output of the time-base expansion circuit 20 is supplied to an output terminal 27 as an ordinary video signal.

Further, during normal recording, the switch 72 is connected to the terminal A thereof by the system controller 37. The skew correction circuit 73 is rendered inoperative. In this instance, therefore, a monitoring action is performed in the same manner as in the case of FIG. 4.

In the case of the embodiment shown in FIG. 9, the monitoring action is arranged to be performed by using one of the dubbing signals of two channels. This arrangement, therefore, permits monitoring during the high-speed dubbing process in the same manner as the system of FIG. 4. In addition to that, dubbing can be monitored on the side of the recording-side VTR without any connecting actions other than the connection required for dubbing.

The number of heads arranged to rotate in a closely adjacent relation in the above-stated embodiments is two. The number of heads may be changed in general to N (N: an integer which is at least 2) according to the desired speed of dubbing. However, in cases where azimuth recording is required by the recording format and dubbing is to be performed with the heads arranged like in the case of the embodiments described above, the number of heads must be an even number.

Further, the dubbing system described is arranged on the assumption of the use of the VTRs having small drums. However, the same advantageous effect is likewise attainable by applying this invention to any of the rotary head type video signal reproducing systems in general as long as they are arranged to perform reproduction with a plurality of heads. The arrangement of the embodiment described can be changed as desired within the scope of the invention as defined in the appended claims.

As described in the foregoing, the reproducing system according to this invention permits easy monitoring for video signals, despite the simple rotary head type arrangement of the system, even in cases where a great quantity of video information is reproduced.

What is claimed is:

1. A video signal reproducing apparatus for reproducing video signals from a tape-shaped recording medium on which time-base-compressed video signals corresponding to video signals for a given period of time are recorded in each of many tracks having different azimuth angles between adjacent tracks, comprising:
   (a) reproducing means for reproducing, by using N rotary heads (N: an integer which is not less than 2) having different azimuth angles between adjacent heads and being disposed in a closely adjacent state, the time-base-compressed video signals as N channel signals from N adjacent tracks formed on the tape-shaped recording medium, wherein
      all of the time-base-compressed video signals recorded in the N adjacent tracks being reproduced at substantially the same time, and
      the time period for reproducing the video signals from the N adjacent tracks being shorter than the given period of time;
   (b) an extracting means for extracting M channel signals (M: an integer which is less than N) from among the N channel signals;
   (c) first output means for outputting said N channel signals substantially simultaneously in a time-base compressed state;
   (d) second output means for outputting the N channel signals as one channel signal; and
   (e) monitoring means arranged to be capable of receiving the M channel signals extracted by said extracting means and the one channel signal output from said second output means and to monitor the video signals.

2. An apparatus according to claim 1, further comprising signal processing means for receiving the N channel signals from said reproducing means at substantially the same time to perform a predetermined process to the video signals and to alter the N channel signals into the one channel signal.

3. An apparatus according to claim 2, wherein said first output means outputs the N channel signals to be received by said signal processing means, and wherein said second output means outputs the one channel signal altered by said signal processing means.

4. An apparatus according to claim 1, wherein said first output means outputs the N channel signals to a recording device, said recording device receiving the N channel signals from said first output means at substantially the same time to record, by using N rotary heads having different azimuth angles between adjacent heads and being disposed in a closely adjacent state, the N channel signals on another tape-shaped recording medium while forming N adjacent tracks on said another tape-shaped recording medium,
   all of the time-base-compressed video signals being recorded onto the N adjacent tracks at substantially the same time.

5. A dubbing system for copying a tape recording medium on which time-base-compressed video signals corresponding to video signals for a given period of time are recorded in each of many tracks having different azimuth angles between adjacent tracks, comprising:
   a reproducing apparatus wherein N rotary heads (N: an integer which is not less than 2) which have different azimuth angles between adjacent heads and are disposed in a closely adjacent state are used for reproducing said time-base-compressed video signals from N adjacent tracks formed on a first tape recording medium, all of said time-base-compressed video signals recorded in said N adjacent tracks being reproduced at substantially the same time, wherein the time period for reproducing said video signals from said N adjacent tracks is shorter than said given period of time;
   a recording apparatus wherein said time-base-compressed video signals are supplied to N rotary heads which have different azimuth angles between adjacent heads and are disposed in a closely adjacent state are used for recording said time-base-compressed video signals onto N adjacent tracks on a second tape recording medium, all of said time-base-compressed video signals being recorded onto said N adjacent tracks at substantially the same time; and
   monitoring device for monitoring said time-base-compressed video signals reproduced by said reproducing apparatus.

6. An apparatus according to claim 5, wherein said monitoring means is capable of monitoring all and part of the time-base-compressed video signals.

7. A video signal reproducing apparatus for copying a first tape-shaped recording medium on which time-base-compressed video signals corresponding to video signals for a given period of time are recorded in each of many tracks having different azimuth angles between adjacent tracks, comprising:
   a) transporting means for transporting the first tape-shaped recording medium a distance corresponding to N tracks (N: an integer which is not less than 2) per said given period of time;
   b) reproducing means for reproducing, by using N rotary heads (N: an integer which is not less than 2) having different azimuth angles between adjacent heads and being disposed in a closely adjacent state, the time-base-compressed video signals as N channel signals from N adjacent tracks formed on the first tape-shaped recording medium,
      all of the time-base-compressed video signals recorded in the N adjacent tracks being reproduced at substantially the same time,
      the time period for reproducing the video signals from the N adjacent tracks being shorter than the given period of time;
   c) output means for outputting said time-base-compressed video signals to a recording apparatus,
      said recording apparatus receiving said time-base-compressed video signals from said first output means at substantially the same time to record, by using N rotary heads having different azimuth angles between adjacent heads and being disposed in a closely adjacent state, said time-base-compressed video signals on a second tape-shaped recording medium while forming N adjacent tracks on said second tape-shaped recording medium,
      all of the time-base-compressed video signals being recorded onto the N adjacent tracks at substantially the same time; and
   d) monitoring means for monitoring said time-base-compressed video signals reproduced by said reproducing means.

8. An apparatus according to claim 7, wherein said reproducing apparatus has a dubbing mode in which each of said N rotary heads is reproduced with a one-track amount of information of signals during a period of time, and a normal reproducing mode in which each of said N rotary heads is produced with a one-track amount of information of signals during a period of time which is N times said given period of time.

9. An apparatus according to claim 8 wherein said reproducing apparatus is further comprised of an actuator arranged to shift positions of said N rotary heads in a direction of an axis of rotation thereof, and control means for causing said actuator to shift the positions of said N rotary heads in the direction of the axis of rotation in said dubbing mode.

10. An apparatus according to claim 9, wherein said monitoring means reduces a number of scanning lines used for monitoring a part of the time-base-compressed video signal to the number which is less than a number of scanning lines used for monitoring all of the time-base-compressed video signals.

11. A method of copying a first tape-shaped recording medium on which time-base-compressed video signals corresponding to video signals for a given period of time are recorded in each of many tracks having different azimuth angles between adjacent tracks, the method comprising the steps of:

a) transporting the first tape-shaped recording medium a distance corresponding to N tracks (N: an integer which is not less than 2) per said given period of time;

b) reproducing, by using N rotary heads (N: an integer which is not less than 2) having different azimuth angles between adjacent heads and being disposed in a closely adjacent state, the time-base-compressed video signals as N channel signals from N adjacent tracks formed on the first tape-shaped recording medium,
all of the time-base-compressed video signals recorded in the N adjacent tracks being reproduced at substantially the same time,
the time period for reproducing the video signals from the N adjacent tracks being shorter than the given period of time;

c) monitoring the reproduced time-base-compressed video signals;

d) outputting the reproduced time-base-compressed video signals to a recording apparatus; and e) receiving the outputted time-base-compressed video signals at said recording apparatus at substantially the same time and recording the received time-base-compressed video signals on a second tape-shaped recording medium while forming N adjacent tracks on said second tape-shaped recording medium, by using N rotary heads having different azimuth angles between adjacent heads and being disposed in a closely adjacent state,
all of the time-base-compressed video signals being recorded onto the N adjacent tracks at substantially the same time.

12. A method according to claim 11, wherein said monitoring step comprises reducing a number of scanning lines used for monitoring a part of the time-base-compressed video signal to the number which is less than a number of scanning lines used for monitoring all of the time-base-compressed video signal.

13. A video signal reproducing apparatus for copying a first tape-shaped recording medium on which time-base-compressed video signals corresponding to video signals for a given period of time are recorded in each of many tracks having different azimuth angles between adjacent tracks, comprising:

a) transporting means for transporting the first tape-shaped recording medium a distance corresponding to N tracks (N: an integer which is not less than 2) per said given period of time;

b) reproducing means for reproducing, by using N rotary heads (N: an integer which is not less than 2) having different azimuth angles between adjacent heads and being disposed in a closely adjacent state, the time-base-compressed video signals as N channel signals from N adjacent tracks formed on the first tape-shaped recording medium,
all of the time-base-compressed video signals recorded in the N adjacent tracks being reproduced at substantially the same time,
the time period for reproducing the video signals from the N adjacent tracks being shorter than the given period of time;

c) output means for outputting said time-base-compressed video signals to a recording apparatus,
said recording apparatus receiving said time-base-compressed video signals from said first output means at substantially the same time to record, by using N rotary heads having different azimuth angles between adjacent heads and being disposed in a closely adjacent state, said time-base-compressed video signals on a second tape-shaped recording medium while forming N adjacent tracks on said second tape-shaped recording medium,
all of the time-base-compressed video signals being recorded onto the N adjacent tracks at substantially the same time; and d) output means for outputting the time-base-compressed video signals reproduced by the reproducing means in a state monitorable by a monitor means.

14. An apparatus according to claim 13, wherein said reproducing apparatus has a dubbing mode in which each of said N rotary heads is reproduced with a one-track amount of information of signals during a period of time, and a normal reproducing mode in which each of said N rotary heads is produced with a one-track amount of information of signals during a period of time which is N times said given period of time.

15. An apparatus according to claim 13 wherein said reproducing apparatus is further comprised of an actuator arranged to shift positions of said N rotary heads in a direction of an axis of rotation thereof, and control means for causing said actuator to shift the positions of said N rotary heads in the direction of the axis of rotation in said dubbing mode.

16. An apparatus according to claim 13, wherein said monitoring means is capable of monitoring all and a part of the time-base-compressed video signals.

17. An apparatus according to claim 13, wherein said monitoring means reduces a number of scanning lines used for monitoring a part of the time-base-compressed video signal to the number which is less than a number of scanning lines used for monitoring all of the time-base-compressed video signals.

* * * * *

UNITED STATES PATENT AND TRADEMARK OFFICE
CERTIFICATE OF CORRECTION

PATENT NO.   : 5,748,832
DATED        : May 5, 1998
INVENTOR(S)  : Koji Takahashi It is certified that error appears in the above-identified patent and that said Letters Patent is hereby corrected as shown below:

Col. 1, line 55, delete " $\partial^o$ " and insert -- $\theta^o$ --.

Signed and Sealed this

Twenty-ninth Day of December, 1998

Attest:

BRUCE LEHMAN

Attesting Officer

Commissioner of Patents and Trademarks